US009543804B2

(12) United States Patent
Oberndorfer

(10) Patent No.: US 9,543,804 B2
(45) Date of Patent: Jan. 10, 2017

(54) ELECTRIC LINEAR DRIVE, IN PARTICULAR FOR ADJUSTING FURNITURE USED FOR SITTING OR LYING DOWN

(71) Applicant: DewertOkin GmbH, Kirchlengern (DE)

(72) Inventor: Andreas Oberndorfer, Bielefeld (DE)

(73) Assignee: DewertOkin GmbH, Kirchlengern (DE)

( * ) Notice: Subject to any disclaimer, the term of this patent is extended or adjusted under 35 U.S.C. 154(b) by 147 days.

(21) Appl. No.: 14/357,260

(22) PCT Filed: Nov. 6, 2012

(86) PCT No.: PCT/EP2012/071897
§ 371 (c)(1),
(2) Date: May 9, 2014

(87) PCT Pub. No.: WO2013/068329
PCT Pub. Date: May 16, 2013

(65) Prior Publication Data
US 2014/0312725 A1    Oct. 23, 2014

(30) Foreign Application Priority Data

Nov. 9, 2011   (DE) .................. 10 2011 122 854
Nov. 9, 2011   (DE) .................. 20 2011 110 086 U
Oct. 19, 2012  (DE) .................. 10 2012 219 113

(51) Int. Cl.
*H02K 7/06* (2006.01)
*A47C 20/04* (2006.01)
(Continued)

(52) U.S. Cl.
CPC .............. *H02K 7/06* (2013.01); *A47C 20/041* (2013.01); *F16H 25/2025* (2013.01);
(Continued)

(58) Field of Classification Search
CPC ..... A47C 20/04; A47C 20/041; A47C 20/042;
A47C 20/047; H02K 7/06; F16H 25/20;
F16H 25/2025; F16H 25/24; F16H
25/2454; F16H 2025/2065; F16H
2025/2068; F16H 2025/2071; F16H
2025/209; F16H 2025/2463
(Continued)

(56) References Cited

U.S. PATENT DOCUMENTS 5,219,045 A * 6/1993 Porter ................... B60N 2/443
188/67
5,329,657 A * 7/1994 Bartley ................ A47C 20/041
5/616
(Continued)

FOREIGN PATENT DOCUMENTS

CH        692805 A5    11/2002
DE     19950689 A1    11/2000
(Continued)

OTHER PUBLICATIONS

Int'l Search Report issued Feb. 4, 2013 in Int'l Application No. PCT/EP2012/071897.
(Continued)

*Primary Examiner* — David M Fenstermacher
*Assistant Examiner* — Leonard J Archuleta
(74) *Attorney, Agent, or Firm* — Panitch Schwarze Belisario & Nadel LLP

(57) ABSTRACT

An electric linear drive, in particular for adjusting moveably mounted parts of furniture used for sitting or lying down, includes a drive motor, a threaded spindle, a speed reduction gear arranged between the drive motor and the threaded spindle, a spindle nut placed on the threaded spindle, which can be selectively locked in the direction of rotation and, depending on the direction of rotation of the threaded
(Continued)

spindle, moved in the axial direction of the threaded spindle. The linear drive has a lifting element for adjusting the moveable furniture parts, the lifting element being driven by axial movement of the spindle nut. Simple design, easy assembly and operation, and robust mounting of the driving parts are achieved.

11 Claims, 3 Drawing Sheets

(51) Int. Cl.
*F16H 25/24* (2006.01)
*F16H 25/20* (2006.01)

(52) U.S. Cl.
CPC ... *F16H 25/2454* (2013.01); *F16H 2025/209* (2013.01); *F16H 2025/2065* (2013.01); *F16H 2025/2071* (2013.01)

(58) Field of Classification Search
USPC ........ 74/89, 89.23, 89.38, 89.39, 89.14, 425
See application file for complete search history.

(56) References Cited

U.S. PATENT DOCUMENTS

| | | | | |
|---|---|---|---|---|
| 5,441,129 A * | 8/1995 | Porter | B60N 2/23 | 188/67 |
| 5,568,843 A * | 10/1996 | Porter | B60N 2/23 | 188/67 |
| 5,675,849 A * | 10/1997 | Koch | F16H 25/2418 | 5/616 |
| 6,116,103 A * | 9/2000 | Heckel, Jr. | F16H 25/20 | 188/69 |
| 6,269,707 B1 * | 8/2001 | Koch | A47C 20/041 | 297/362.14 |
| 6,300,732 B1 * | 10/2001 | Brambilla | A47C 1/03211 | 180/6.5 |
| 6,315,361 B1 * | 11/2001 | Stone | B60N 2/0248 | 297/362.12 |
| 6,322,146 B1 * | 11/2001 | Fisher, Jr. | B60N 2/0232 | 297/362.11 |
| 6,679,555 B2 * | 1/2004 | Bangert | A47C 20/08 | 297/316 |
| 8,015,890 B2 * | 9/2011 | Christensen | F16H 25/2021 | 192/56.62 |
| 8,084,966 B2 * | 12/2011 | Dewert | A47C 20/041 | 297/285 |
| 8,201,468 B2 * | 6/2012 | Heinrichs | A47C 20/041 | 74/89.23 |
| 8,226,167 B2 * | 7/2012 | Bruck | B60N 2/233 | 185/37 |
| 8,555,431 B2 * | 10/2013 | Nielsen | | 5/16 |
| 8,622,475 B2 * | 1/2014 | Bruck | B60N 2/233 | 185/37 |
| 8,763,483 B2 * | 7/2014 | Heinrichs | A47C 20/041 | 318/7 |
| 8,875,592 B2 * | 11/2014 | Bastholm | A47C 20/041 | 74/89.38 |
| 2002/0036421 A1 * | 3/2002 | Bangert | A47C 20/041 | 297/316 |
| 2004/0169408 A1 * | 9/2004 | Dewert | A47C 20/041 | 297/285 |
| 2006/0081079 A1 | 4/2006 | Jaecklin et al. | | |
| 2007/0285035 A1 * | 12/2007 | Roither | A47C 20/041 | 318/120 |
| 2008/0121852 A1 * | 5/2008 | Koch | A47C 20/041 | 254/100 |
| 2009/0044646 A1 * | 2/2009 | Duck | B65D 73/0085 | 74/89.39 |
| 2009/0133519 A1 | 5/2009 | Lorenzen | | |
| 2009/0301239 A1 * | 12/2009 | Heinrichs | A47C 20/041 | 74/89.37 |
| 2010/0031761 A1 * | 2/2010 | Daul | B60N 2/233 | 74/89.24 |
| 2010/0139427 A1 | 6/2010 | Yamaguchi et al. | | |
| 2010/0139428 A1 * | 6/2010 | Roither | A47C 20/041 | 74/89.33 |
| 2010/0148558 A1 * | 6/2010 | Bruck | B60N 2/233 | 297/362.14 |
| 2011/0025150 A1 * | 2/2011 | Heinrichs | A47C 20/041 | 310/83 |
| 2011/0043062 A1 | 2/2011 | Lorenzen | | |
| 2011/0241402 A1 * | 10/2011 | Bruck | B60N 2/233 | 297/362.14 |
| 2012/0096963 A1 * | 4/2012 | Hung | F16H 25/2454 | 74/89.38 |
| 2012/0227522 A1 * | 9/2012 | Wu | F16H 25/20 | 74/89.14 |
| 2016/0017966 A1 * | 1/2016 | Wu | F16H 25/2025 | 74/89.38 |

FOREIGN PATENT DOCUMENTS

TW          M400533 U       3/2011
WO       2012143383 A2    10/2012

OTHER PUBLICATIONS

Int'l Preliminary Report on Patentability issued May 22, 2014 in Int'l Application No. PCT/EP2012/071897.

* cited by examiner

ELECTRIC LINEAR DRIVE, IN PARTICULAR FOR ADJUSTING FURNITURE USED FOR SITTING OR LYING DOWN

CROSS-REFERENCE TO RELATED APPLICATIONS

This application is a Section 371 of International Application No. PCT/EP2012/071897, filed Nov. 6, 2012, which was published in the German language on May 16, 2013, under International Publication No. WO 2013/068329 A1 and the disclosure of which is incorporated herein by reference.

BACKGROUND OF THE INVENTION

The invention concerns an electric motor-actuated linear drive, in particular for adjusting moveably mounted parts of lying and seating furniture, including for the medical sector like rehabilitation organizations, care beds, etc. The drive comprises a drive motor, a threaded spindle, a speed reduction gear arranged between the drive motor and the threaded spindle, a spindle nut which is carried on the threaded spindle and which can be selectively arrested in the direction of rotation and which is displaceable in the axial direction of the threaded spindle in dependence on the direction of rotation of the threaded spindle, and a stroke element drivable by the axial movement of the spindle nut for adjusting the moveable furniture parts.

Such an electric motor-actuated linear drive can be used both as an individual drive and also as a dual drive.

European Patent EP 0 968 675 B1 already discloses an individual or dual drive provided in particular for articles of furniture in the hospital sector and/or the care sector. In the case of that known linear drive a worm which is carried on a motor shaft and which is in engagement with a worm gear is provided as the speed reduction gear. The worm gear is mounted rotatably on a guide body which is arranged fixedly on the threaded spindle and on which a coupling wheel is guided non-rotatably but axially displaceably. When the coupling wheel is coupled to the worm gear, the threaded spindle is driven, while in the uncoupled condition the threaded spindle is stationary. Arranged non-rotatably on the threaded spindle is a spindle nut which is connected to a stroke element and which, in dependence on the direction of rotation of the threaded spindle, is displaced in the axial direction and drives the stroke element serving to actuate the moveable furniture parts.

Such a drive mechanism has admittedly already proven its worth in practice, but such a mechanism is relatively complicated and expensive and cannot be loaded just as may be desired.

BRIEF SUMMARY OF THE INVENTION

Therefore the object of the invention is to provide a linear drive which is of a simple structure, which can be easily assembled and operated and which ensures robust mounting for the drive components.

According to the invention that object is attained in that the drive wheel of the speed reduction gear is fixedly connected to the threaded spindle, the stroke element is guided non-rotatably with respect to its longitudinal axis in the axial direction of the threaded spindle, and the spindle nut can be coupled to the non-rotatably guided stroke element in such a way that it is selectively connectable non-rotatably thereto or is releasable therefrom.

The principle of the structure according to the invention is uncomplicated and robust in construction for the drive train is continuous in a straight line from the drive gear of the speed reduction gear to the stroke element so that even greater forces can be transmitted without a problem.

With the structure according to the invention the spindle nut is desirably mounted in the stroke element rotatably but fixedly in the axial direction relative thereto, so that it only requires a simple coupling to connect the spindle nut non-rotatably to the stroke element or to release it therefrom. In an emergency situation or in the event of a power failure the coupling then only needs to be released. Since with this kind of linear drives the thread between the spindle and the spindle nut is not self-locking, the adjusted furniture parts then automatically move back into their lowered basic position.

Preferably, a wrap spring is provided as the coupling between the stroke element and the spindle nut. Such a wrap spring coupling is of a simple structure and can be easily engaged and disengaged.

In the configuration of the wrap spring coupling according to the invention, the end of the wrap spring, that is towards the stroke element, can be connected to the stroke element, wherein the wrap spring in its normal condition tightly surrounds the spindle nut and connects it non-rotatably to the stroke element. As an alternative thereto, the wrap spring in the normal operating condition can also be arranged tightly within a sleeve connected to the stroke element. The coupling can be released by actuation of the end of the wrap spring, that is remote from the stroke element, by the wrap spring being enlarged somewhat. As a result, there is then no longer a rigid connection between the spindle nut and the stroke element. In an emergency situation or in the event of a power failure, the spindle nut can then rotate freely with the spindle, so that the stroke element is moved back and the lifted furniture part moves downwardly.

To afford the optimum design configuration for the wrap spring coupling, a fixedly arranged sleeve of a material of high strength and with good friction properties can be provided between the outer periphery of the spindle nut and the wrap spring. Good, favorable and operationally appropriate frictional properties are afforded by the wrap spring in the normal operating condition reliably transmitting the frictional moment while the spindle nut in the actuated and uncoupled condition can rotate with an easy movement. A wrap spring coupling of optimum configuration, with a long service life, can thus be afforded by a suitable choice of the material.

To actuate the wrap spring coupling in order to release it, a rotatably but axially non-displaceably arranged actuating ring can be provided on the outer periphery of the spindle nut or on the sleeve, which actuating ring on the one hand is connected to the end of the wrap spring, that is remote from the stroke element, while on the other hand it has an actuating element for rotation of the actuating ring in the opening direction of the wrap spring.

The actuating element of the actuating ring is preferably in the form of a radially projecting nose, while arranged parallel to the threaded spindle along the path of displacement of the spindle nut is an actuating bar, which bears against the radially projecting nose and which is moveable in the tangential direction relative to the actuating ring to rotate the actuating ring and thereby to open the wrap spring.

The actuating bar is desirably provided with a plurality of inclined surfaces which are arranged displaced in the axial direction and which cooperate with corresponding counterpart surfaces on the housing.

The actuating bar can be moveable by hand by way of a lever or also by way of a remote control. A Bowden cable desirably serves as the remote control.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
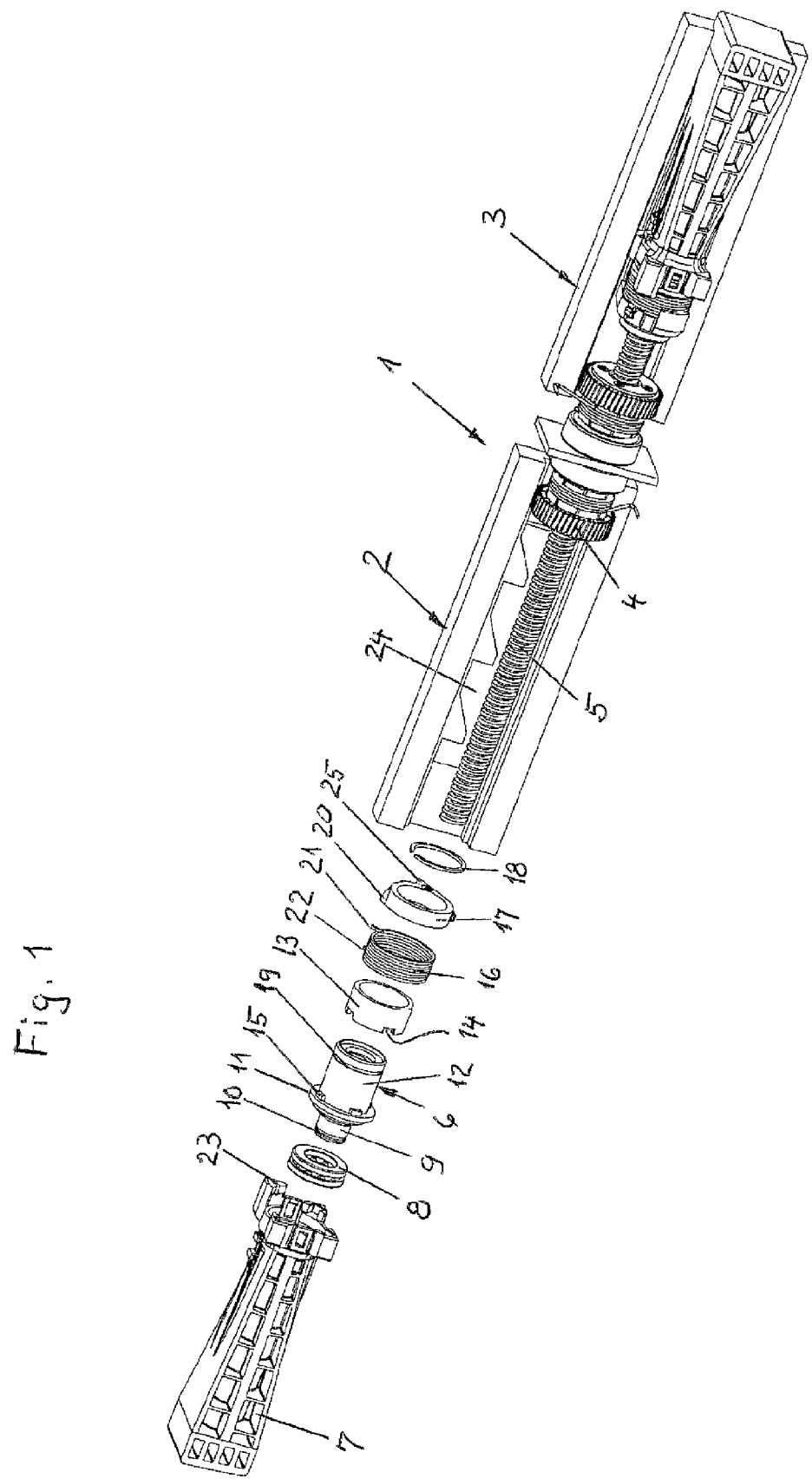
FIG. 1 is a longitudinal perspective view of a dual drive according to an embodiment of the invention, in which the left-hand drive in the longitudinal direction is shown as an exploded view.

Referring to FIG. 1 of the drawing the dual drive 1 comprises a left-hand drive 2 and a right-hand drive 3 arranged in mirror-image relationship therewith.

The individual parts and the mode of operation are described with reference to the example of the left-hand drive 2.

A drive motor (not shown in the drawing) drives a threaded spindle 5 by way of a speed reduction gear, of which only the drive gear 4 is shown. In that case the drive gear 4 of the speed reduction gear is fixedly connected to the threaded spindle 5.

Carried on the threaded spindle 5 is a spindle nut 6 which can be selectively arrested in the direction of rotation and which is displaceable in the axial direction of the threaded spindle 5 in dependence on the direction of rotation of the threaded spindle 5.

A stroke element 7 is displaced in the axial direction of the threaded spindle 5 by the axial movement of the spindle nut 6, the stroke element 7 serving to adjust a respective moveable furniture part (not shown).

Anchored to the stroke element 7 on the side towards the spindle nut 6 is an axial thrust ball bearing 8 into which an end spigot 9 of the spindle nut 6 engages in positively locking relationship. At its end which is passed through the axial ball bearing 8, the end spigot 9 has an annular groove 10 into which a circlip (not shown) is fitted after insertion of the end spigot 9 into the axial ball bearing 8, whereby the spindle nut 6 is fixedly anchored to the axial ball bearing 8 and thereby also to the stroke element 7. The end spigot 9 is delimited at the spindle nut 6 by a radially projecting flange 11, which in the assembled condition bears against the axial ball bearing 8.

On the side of the radial flange 11 that is remote from the end spigot 9, the spindle nut 6, which for example comprises plastic material, is in the form of a cylinder 12. Fitted onto that cylinder 12 is a cylindrical sleeve 13 which fits onto the cylinder 12 in positively locking relationship. In that case the sleeve 13 is pushed onto the cylinder 12 to such an extent that it comes to bear against the radial flange 11. The sleeve 13 is secured in the direction of rotation of the spindle nut 6 by axial recesses 14 in the sleeve engaging into corresponding projections 15 on the spindle nut 6.

The sleeve 13, which preferably comprises steel with good frictional properties, serves to receive a wrap spring 16 which fits tightly thereon and which in this condition serves as a wrap spring coupling between the spindle nut 6 and the stroke element 7.

After the sleeve 13 and the wrap spring 16 are pushed onto the cylinder 12 of the spindle nut 6, an actuating ring 17 is also pushed onto the end of the cylinder 12; the actuating ring 17 is secured on the cylinder 12 by means of a circlip 18. The circlip 18 engages into an annular groove 19 provided just before the end of the cylinder 12 and thereby fixedly holds the sleeve 13 and the wrap spring 16 carried tightly thereon and the actuating ring 17 on the cylinder 12.

The actuating ring 5 is mounted rotatably on the cylinder 12 between the sleeve 13 and the circlip 18. At its outer periphery the actuating ring 17 is provided with a projection 20, against which bears the end 21 of the wrap spring 16, that is away from the stroke element 7, while the opposite free end 22 of the wrap spring 16 is fixed to a holder 23 of the stroke element 7.

In this condition in which the wrap spring 16 is carried fixedly on the sleeve 13 and thus couples the spindle nut 6 non-rotatably to the stroke element 7, a rotation of the threaded spindle 5 causes a forward or rearward movement of the stroke element 7.

Release of the wrap spring coupling can be effected by the actuating ring 17, in the embodiment illustrated in the drawing, being rotated towards the right in the clockwise direction, whereby the wrap spring 16 opens so that consequently the spindle nut 6 rotates with the threaded spindle 5 and transmits no movement to the stroke element 7. That mechanism is important, in particular, when the corresponding furniture part is to be lowered for example in the event of a power failure or in an emergency situation.

In the case of a power failure and with the threaded spindle 5 stationary, the uncoupled spindle nut 6 can freely rotate back on the threaded spindle 5, as the thread between the spindle nut 6 and the threaded spindle 5 is not a locking thread.

An actuating bar 24, which is arranged parallel to the threaded spindle 5 along the displacement path of the spindle nut 6, serves for rotating the actuating ring 17 into the uncoupling position of the wrap spring 16. The actuating bar 24 cooperates with a radially projecting nose 25 on the actuating ring 17. The actuating bar 24 is moveable in the tangential direction relative to the actuating ring 17, and for uncoupling the wrap spring 16 presses the nose 25 on the actuating ring 17 into a stressed position, in which the wrap spring 16 enlarges and releases the spindle nut 6.

The actuating bar 24 is provided with a plurality of inclined surfaces 26, which are arranged displaced in the axial direction and which cooperate with corresponding counterpart surfaces 27 on the housing.

The actuating bar 24 can be moved by way of a simple hand lever or a remote control, for example a Bowden cable. When the actuating bar 24 moves, it slides along against the counterpart surfaces 27 of the housing, so that its movement involves both an axial component and also a vertical component. By virtue of the vertical component, the actuating bar 24 presses against the nose 25 of the actuating ring 17 and rotates it, so that the wrap spring 16 opens and triggers the uncoupling process.

Figure 2:
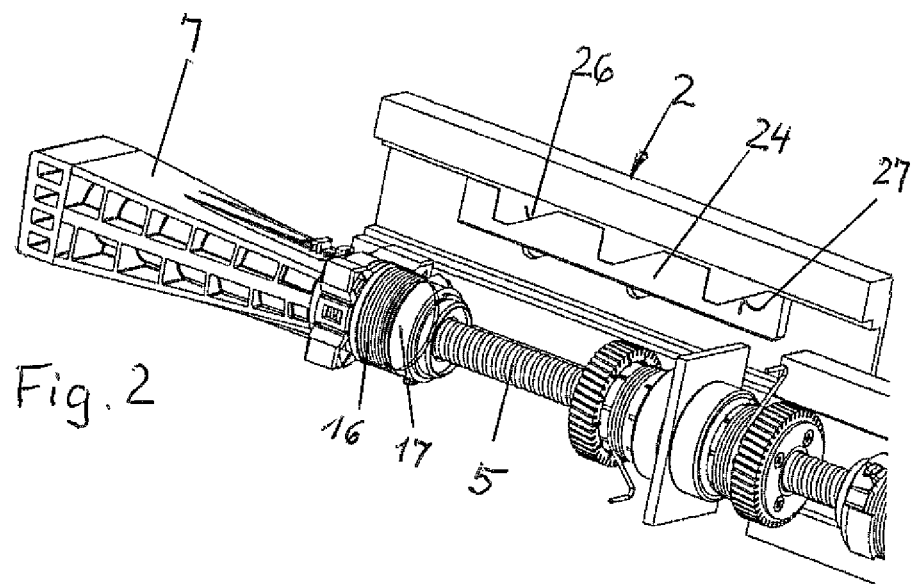
FIG. 2 is a partial perspective view similar to FIG. 1, in which the left-hand drive is shown in the transverse direction in an exploded view and showing the coupled position.
Figure 3:
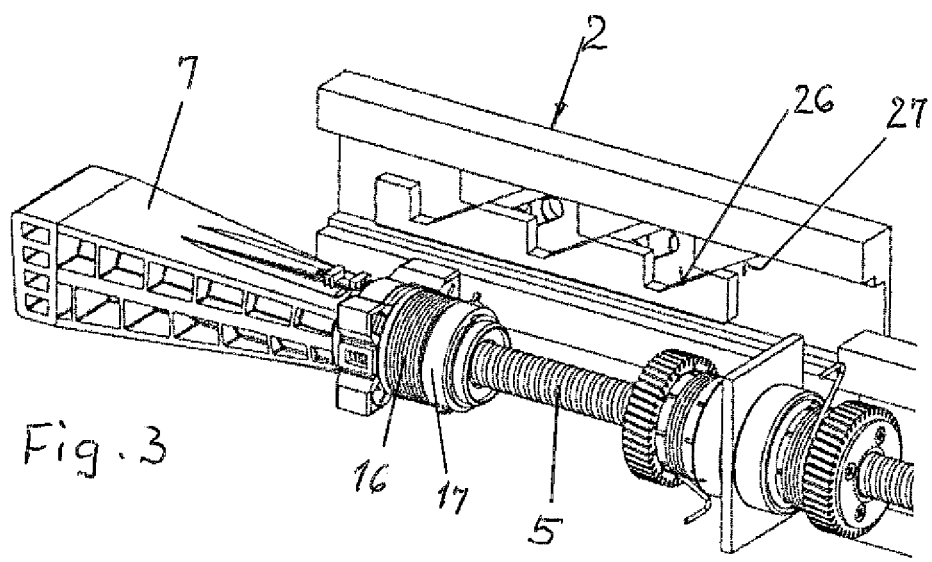
FIG. 3 is the same view as in FIG. 2 in the uncoupled condition.

FIGS. 2 and 3 show an exploded side view of the coupled and the uncoupled conditions of the wrap spring 16.

It will be seen from FIG. 2, showing the coupled condition, that the actuating bar 24 assumes its highest position, in which the wrap spring 16 is carried tightly on the spindle nut 6 or the sleeve 13.

In FIG. 3, showing the uncoupled condition, the actuating bar 24 is displaced a distance towards the left in the drawing, in which case the inclined surfaces 26 of the actuating bar 24 have slid along against the counterpart surfaces 27 of the housing, and the actuating bar 24 is thus displaced a distance downwardly, so that the wrap spring 16 opens due to the cooperation of the actuating bar 24 with the nose 25 on the actuating ring 17, so that the spindle nut 6 is uncoupled from the stroke element 7.

Figure 4:
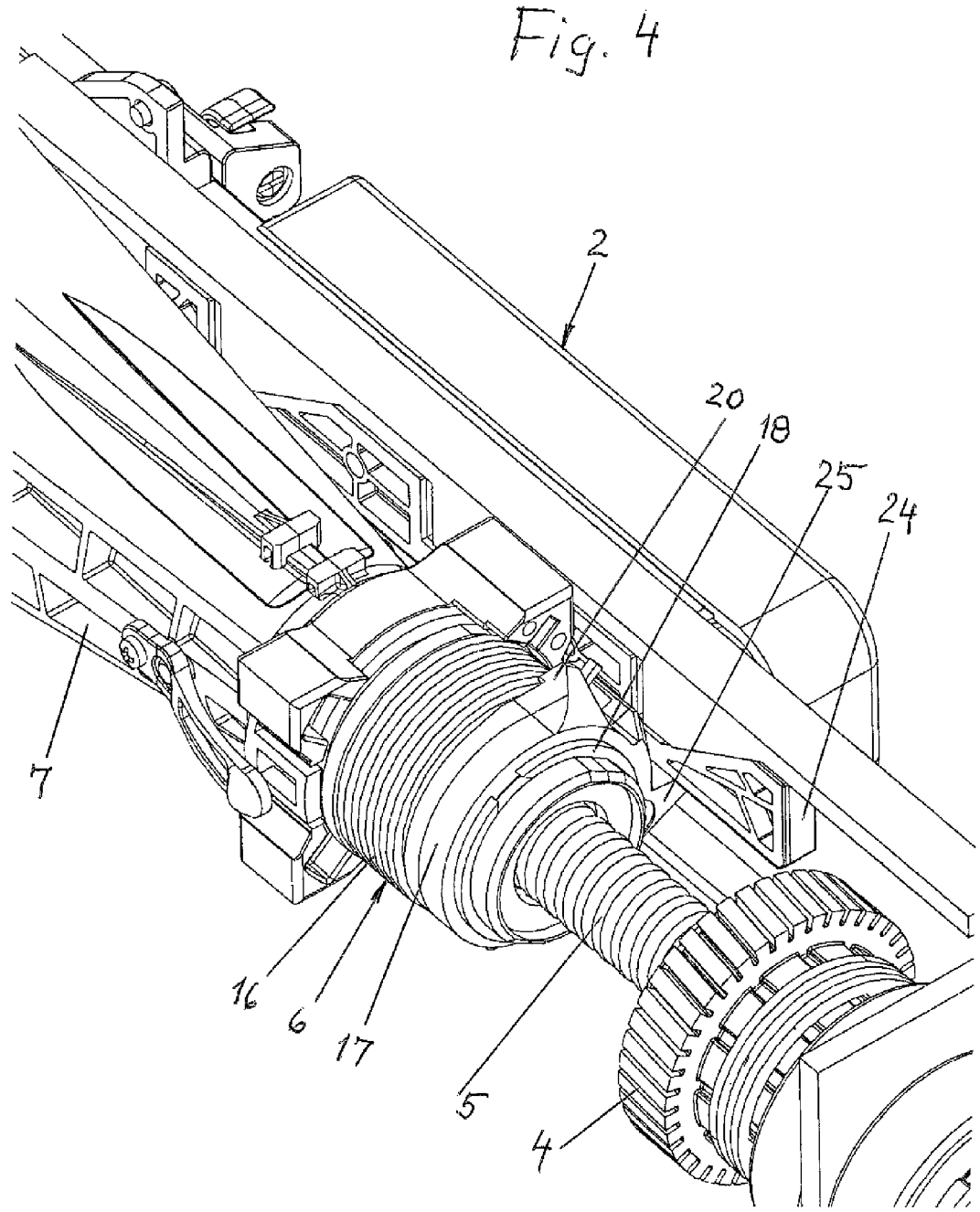
FIG. 4 is a perspective view on an enlarged scale of a portion from the left-hand drive, in which all structural components are shown in the non-exploded condition.

FIG. 4 is an enlarged view better showing some details. In particular, this view particularly clearly shows how the actuating bar 24 presses against the nose 25 on the actuating ring 17 and thus opens the wrap spring 16 and brings about the uncoupling process.

The arrangement of the spindle nut 6 and the stroke element 7 can be freely selected within certain limits. It is preferred, however, that the spindle nut 6 be arranged and mounted completely in the stroke element 7. The advantage here lies in a compact structure. As an alternative thereto, the spindle nut 6 is arranged partially in the stroke element 7.

In the case of the arrangement of the spindle nut 6 and the stroke element 7, however, it is essential that the spindle nut 6 and the stroke element 7 be mounted jointly. As an alternative thereto, the spindle nut 6 can be arranged or mounted at a spacing relative to the stroke element 7.

The invention claimed is:

1. An electric motor-actuated linear drive for adjusting moveable parts, the drive comprising:
a drive motor, a threaded spindle, a speed reduction gear arranged between the drive motor and the threaded spindle, a spindle nut being carried on the threaded spindle, the spindle nut being selectively arrestable in a direction of rotation, and being displaceable in an axial direction of the threaded spindle in dependence on the direction of rotation of the threaded spindle, and a stroke element drivable by axial movement of the spindle nut for adjusting the moveable parts,
wherein a drive wheel of the speed reduction gear is fixedly connected to the threaded spindle,
wherein the stroke element is guided non-rotatably with respect to its longitudinal axis in the axial direction of the threaded spindle,
wherein the spindle nut is coupleable to the non-rotatably guided stroke element, such that the spindle nut is selectively connectable non-rotatably thereto or is releasable therefrom,
wherein a wrap spring couples the stroke element with the spindle nut,
wherein an end of the wrap spring toward the stroke element is connected to the stroke element,
wherein the wrap spring tightly surrounds the spindle nut in a normal condition of the wrap spring and connects the spindle nut non-rotatably to the stroke element, and
wherein the coupling is releasable by actuation and enlargement of an end of the wrap spring remote from the stroke element.

2. The electric motor-actuated linear drive as set forth in claim 1, wherein the spindle nut is rotatably mounted in relation to the stroke element but fixedly in the axial direction relative thereto.

3. The electric motor-actuated linear drive as set forth in claim 1, wherein an axial rolling bearing is fixed in the stroke element, and wherein a cylindrical end of the spindle nut toward the stroke element is mounted in the axial rolling bearing and is fixed in the axial direction.

4. The electric motor-actuated linear drive as set forth in claim 1, wherein the spindle nut has a cylindrical outside periphery on which the wrap spring is arranged.

5. The electric motor-actuated linear drive as set forth in claim 4, further comprising a sleeve between an outside periphery of the spindle nut and the wrap spring, the sleeve being arranged non-rotatably on the spindle nut and comprising a material of high strength and with good friction properties.

6. The electric motor-actuated linear drive as set forth in claim 5, further comprising an actuating ring arranged in a rotatably but axially non-displaceable manner on the outside periphery of the spindle nut or on the sleeve, the actuating ring being connected to an end of the wrap spring remote from the stroke element and having an actuating element for rotation of the actuating ring in an opening direction of the wrap spring.

7. The electric motor-actuated linear drive as set forth in claim 6, wherein the actuating element of the actuating ring has a form of a radially projecting nose, wherein an actuating bar is arranged parallel to the threaded spindle along a path of displacement of the spindle nut, and wherein the actuating bar bears against the radially projecting nose and is moveable in a tangential direction relative to the actuating ring to rotate the actuating ring and thereby open the wrap spring.

8. The electric motor-actuated linear drive as set forth in claim 1, wherein the drive is configured to moveably adjust mounted parts of lying and seating furniture.

9. An electric motor-actuated linear drive for adjusting moveable parts, the drive comprising:
a drive motor, a threaded spindle, a speed reduction gear arranged between the drive motor and the threaded spindle, a spindle nut being carried on the threaded spindle, being selectively arrestable in a direction of rotation, and being displaceable in an axial direction of the threaded spindle in dependence on the direction of rotation of the threaded spindle, and a stroke element drivable by axial movement of the spindle nut for adjusting the moveable parts, wherein a drive wheel of the speed reduction gear is fixedly connected to the threaded spindle,
wherein the stroke element is guided non-rotatably with respect to its longitudinal axis in the axial direction of the threaded spindle,
wherein the spindle nut is coupleable to the non-rotatably guided stroke element, such that the spindle nut is selectively connectable non-rotatably thereto or is releasable therefrom,
wherein a wrap spring couples the stroke element with the spindle nut,
wherein the spindle nut has a cylindrical outside periphery on which the wrap spring is arranged;
the electric motor-actuated linear drive further comprising a sleeve between an outside periphery of the spindle nut and the wrap spring, the sleeve being arranged non-rotatably on the spindle nut and comprising a material of high strength and with good friction properties, and an actuating ring arranged in a rotatably but axially non-displaceable manner on the outside periphery of the spindle nut or on the sleeve, the actuating ring being connected to an end of the wrap spring remote from the stroke element and having an actuating element for rotation of the actuating ring in an opening direction of the wrap spring, wherein the actuating element of the actuating ring has a form of a radially projecting nose, wherein an actuating bar is arranged parallel to the threaded spindle along a path of displacement of the spindle nut, wherein the actuating bar bears against the radially projecting nose and is moveable in a tangential direction relative to the actuating ring to rotate the actuating ring and thereby open the wrap spring, and wherein the actuating bar comprises a plurality of inclined surfaces arranged displaced in the axial direction and cooperating with corresponding counterpart surfaces on a housing.

10. The electric motor-actuated linear drive as set forth in claim 9, wherein the actuating bar is displaceable by a remote control.

11. The electric motor-actuated linear drive as set forth in claim 10, wherein the remote control comprises a Bowden cable.

* * * * *